United States Patent Office 3,440,172
Patented Apr. 22, 1969

3,440,172
PHOTOLUMINESCENT GLASS SYSTEMS
Marvin J. Albinak and Warren H. Turner, Toledo, Ohio,
assignors to Owens-Illinois, Inc., a corporation of Ohio
No Drawing. Filed Sept. 16, 1964, Ser. No. 397,675
Int. Cl. C09k 1/04
U.S. Cl. 252—301.6  4 Claims

ABSTRACT OF THE DISCLOSURE

Photoluminescent glasses characterized by an extremely high degree of durability. Typical systems are alkali-free and are silica-alumina-zinc oxide systems. In these systems, the RO constituent is ZnO. It is this compound that provides a synergistic system with at least one other activator selected from the group of CuO, SnO, and $Sb_2O_3$. Substantial amounts of alkali metal oxides also can be used in the base glasses. When so operating, the ratio of ZnO to $SiO_2$ is retained at a sufficiently high order of magnitude to provide an active $ZnO/SiO_2$ photoluminescent system. The essential compositional ingredients and proportions are as follows:

| | Parts by weight |
|---|---|
| $SiO_2$ | 30–80 |
| $Al_2O_3$ | 1–20 |
| ZnO | 10–25 |
| CuO | 0.001–1.0 |
| SnO or $Sb_2O_3$ | 0.1–20 |

---

This invention relates to photoluminescent glass compositions, and more particularly, to photoluminescent glasses comprising a novel luminescent activator system in the form of a combination of metal oxides, which functions unexpectedly to produce high levels of photoluminescence.

THE PROBLEM

Luminescence in glass is known. However, it has always been a challenge to the art to produce photoluminescent glasses displaying practicably useable levels of photoluminescent output brightness. In most instances, the output is undesirably low and thus the glasses are not adapted to practical applications such as advertising media.

These would include photoluminescent powders carried on a suitable support and activated to produce luminescence by an excitation energy source such as an ultraviolet ray tube positioned nearby to radiate ultraviolet rays upon the powders. Practical applications would also include glow-tube-type signs made from glass tubing wherein the tubing wall itself produces photoluminescence under the influence of ultraviolet rays developed by an electrically excited gas, such as mercury vapor, contained within the tubing.

Therefore, if it were possible to produce glasses having very high levels of photoluminescent emissions, a substantial advance indeed would be provided for the art.

Accordingly, an important object of the present invention is to provide novel photoluminescent glass systems.

A further object is to provide novel photoluminescent glass system wherein a combination of photoluminescent ingredients combined into the glass, produces unexpectedly high photoluminescent output emission levels, in a synergistic-type action.

A further object is to provide novel photoluminescent glass systems wherein a synergistic combination of photoluminescent ingredients is utilized in the glassy phase.

A further object is to provide novel photoluminescent glass systems applicable to a broad spectrum of base glasses.

A further object is to provide novel photoluminescent glass compositions wherein the RO component is principally based on zinc oxide.

A still further object is to provide a novel photoluminescent glass activator system comprising in combination zinc oxide and at least one compound selected from the group of CuO, SnO and $Sb_2O_3$.

THE INVENTION—A BRIEF PRELIMINARY VIEW

In accordance with the present invention, a novel contribution is provided to the art in the form of photoluminescent glasses wherein the glasses are characterized by high level photoluminescent emissions, yet wherein relatively low and economical levels of luminescent activators are employed.

The present invention is applicable to a broad spectrum of base glasses, including both alkali-free and alkali-containing glasses.

One suitable alkali-free base glass is a silica-alumina-zinc oxide system. These glasses are characterized by an extremely high degree of durability. In these systems, in accordance with the present invention, the RO constituent utilized is ZnO. It is this compound that provides a synergistic system with the other selected luminescent activators, which are otherwise added in relatively small amounts.

Substantial amounts of alkali metal oxides also can be used in the base glasses according to the present invention. When so operating, the ratio of ZnO to $SiO_2$ is retained at a sufficiently high order of magnitude to provide an active $ZnO/SiO_2$ photoluminescent system.

From the foregoing, it is evident that the invention is applicable to a broad spectrum of base glasses.

The following factors further characterize the invention:

(1) In accordance with this invention, the synergistic activators that are combined into the base glasses for coaction with the zinc oxide component of the base glass are three in number: these include CuO, SnO, and $Sb_2O_3$. The tin and antimony function in a generally equivalent manner. At least one of these compounds is added to the ZnO-containing base glass system.

(2) The copper, tin, or antimony oxides are added to the base glass to produce, with the zinc oxide, an overall combination system that produces unexpectedly high photoluminescent emission output.

The overall compositional range of glasses encompassed within the total scope of the present invention is summarized in Table I, following. The detailed compositions of a number of specific glasses falling within the compositional range of Table I, are set forth in the examples following Table I. Also, photoluminescent data and other observations are set forth in the various examples.

TABLE I.—BATCH COMPOSITIONAL RANGES

| Ingredients | Parts by weight | |
|---|---|---|
| | Broad | Preferred |
| $SiO_2$ | 30–80 | 32–65 |
| $Al_2O_3$ | 1–20 | 1.8–18.5 |
| RO=ZnO, with optional lower levels of BaO, CaO, SrO, MgO | 10–25 | 12–22 |
| $R_2O=(Na_2O, K_2O, Rb_2O, Cs_2O)$ | 0–20 | 0–12 |
| $B_2O_3$ | 0–35 | 0–32 |
| Activator=CuO | .001–1.0 | .01–0.5 |
| SnO or $Sb_2O_3$ | 0.1–20 | 0.5–2.5 |

The copper oxide, and tin oxide or antimony oxide appear to be substantially additive up to the point where photoluminescence begins to diminish.

Relative to the above compositional ranges, it is to be noted that a substantial $SiO_2$-ZnO component is present. It is also to be noted that this $SiO_2$-ZnO component is present in combination with a relatively broad range of $Al_2O_3$ constituent.

The fact that the invention is applicable to a relatively broad range of basic glass compositions is demonstrated by the following examples. Further ramifications within the scope of the invention will become apparent to those skilled in the art.

Example I

A glass was made from the following batch:

| Ingredients: | Parts by weight |
| --- | --- |
| $SiO_2$ | 61.0 |
| $Al_2O_3$ | 18.5 |
| ZnO | 20.5 |
| CuO | 0.5 |

The photoluminescent color of this glass under ultraviolet rays was green. The glass displayed a blue to blue-green color by transmitted light.

Example II

A photoluminescent glass was melted from the following batch:

| Ingredients: | Parts by weight |
| --- | --- |
| $SiO_2$ | 60.7 |
| $Al_2O_3$ | 17.1 |
| ZnO | 21.4 |
| SnO | 0.8 |

The photoluminescent color of this glass under ultraviolet rays was white. The glass was colorless by transmitted light.

Example III

A glass was melted from the following batch:

| Ingredients: | Parts by weight |
| --- | --- |
| $SiO_2$ | 45.8 |
| $Al_2O_3$ | 1.8 |
| ZnO | 22.9 |
| $K_2O$ | 10.9 |
| $B_2O_3$ | 18.3 |
| SnO | 0.92 |

The photoluminescent color of this glass under ultraviolet rays was white. The glass was colorless by transmitted light.

Example IV

A photoluminescent opal glass was melted from the following batch:

| Ingredients: | Parts by weight |
| --- | --- |
| $SiO_2$ | 32.1 |
| $Al_2O_3$ | 7.9 |
| ZnO | 12.0 |
| SnO | 16.0 |
| $B_2O_3$ | 32.0 |

This glass melted satisfactorily and formed an opal that produced white photoluminescence under the influence of ultraviolet rays.

Example V

A glass was melted from the following batch:

| Ingredients: | Parts by weight |
| --- | --- |
| $SiO_2$ | 64.97 |
| $Al_2O_3$ | 9.19 |
| ZnO | 14.67 |
| $Na_2O$ | 11.17 |
| SnO | 1.0 |
| CuO | 1.0 |

The photoluminescent color of this glass was yellow under ultraviolet rays. By transmitted light, the glass was a copper ruby. As a general rule, the upper level of copper is established by the point at which a copper ruby is formed.

Example VI

A glass was melted from the following batch, which is similar to that of Example V except that $Sb_2O_3$ is substituted for the SnO.

| Ingredients: | Parts by weight |
| --- | --- |
| $SiO_2$ | 64.97 |
| $Al_2O_3$ | 9.19 |
| ZnO | 14.67 |
| $Na_2O$ | 11.17 |
| CuO | 1.0 |
| $Sb_2O_3$ | 1.0 |

The photoluminescent color of this glass was yellow under ultraviolet rays. By transmitted light, the glass was a copper ruby.

Example VII

A glass was melted from the following batch, which is similar to that of Example V except that lower levels of tin oxide and copper oxide were used:

| Ingredients: | Parts by weight |
| --- | --- |
| $SiO_2$ | 64.97 |
| $Al_2O_3$ | 9.19 |
| ZnO | 14.67 |
| $Na_2O$ | 11.17 |
| SnO | 0.25 |
| CuO | 0.25 |

The photoluminescent color of this glass was greenish-white (cool white) under short wave ultraviolet (2537 Angstrom line). The glass was colorless by transmitted light.

Example VIII

A soda-zinc-silica glass was melted from the following batch:

| Ingredients: | Parts by weight |
| --- | --- |
| $SiO_2$ | 71.7 |
| $Al_2O_3$ | 1.5 |
| $Na_2O$ | 13.0 |
| ZnO | 13.8 |
| SnO | 0.5 |

This glass melted satisfactorily and was colorless by transmitted light. The photoluminescent emission of the glass under the influence of ultraviolet was white.

Example IX

A zinc crown glass was melted from the following batch. It will be noted that the batch is similar to that of Example VIII with the $R_2O$ component comprised of both $Na_2O$ and $K_2O$ instead of stright $Na_2O$ of Example VIII.

| Ingredients: | Parts by weight |
| --- | --- |
| $SiO_2$ | 63.9 |
| $Al_2O_3$ | 1.6 |
| $Na_2O$ | 4.6 |
| $K_2O$ | 10.5 |
| ZnO | 17.3 |
| $B_2O_3$ | 2.2 |
| SnO | 0.5 |

This glass melted satisfactorily and also was colorless by transmitted light. The photoluminescent emission of the glass under the influence of ultraviolet was white.

UNIQUE ASPECT OF THE PRESENT INVENTION

The luminescent activating system of the present invention is unique as regards photoluminescence. This is clearly distinguishable from cathodoluminescence, wherein relatively small amounts of zinc strikingly decrease the cathodoluminescent emissions. Therefore, the $ZnO$-$CuO$/$SnO$/$Sb_2O_3$ system of the present invention is believed to provide a substantial advance in the art of photoluminescence.

What is claimed is:

1. A glass composition characterized by high level photoluminescent emissions under appropriate excitation and having a batch compositional analysis consisting essentially of the following ingredients and proportions:

| Ingredients: | Parts by weight |
|---|---|
| $SiO_2$ | 45.8 |
| $Al_2O_3$ | 1.8 |
| $ZnO$ | 22.9 |
| $K_2O$ | 10.9 |
| $B_2O_3$ | 18.3 |
| $SnO$ | 0.92 |

2. A glass composition characterized by high level photoluminescent emissions under appropriate excitation and having a batch compositional analysis consisting essentially of the following ingredients and proportions:

| Ingredients: | Parts by weight |
|---|---|
| $SiO_2$ | 32.1 |
| $Al_2O_3$ | 7.9 |
| $ZnO$ | 12.0 |
| $SnO$ | 16.0 |
| $B_2O_3$ | 32.0 |

3. A glass composition characterized by high level photoluminescent emissions under appropriate excitation and having a batch compositional analysis consisting essentially of the following ingredients and proportions:

| Ingredients: | Parts by weight |
|---|---|
| $SiO_2$ | 71.7 |
| $Al_2O_3$ | 1.5 |
| $Na_2O$ | 13.0 |
| $ZnO$ | 13.8 |
| $SnO$ | 0.5 |

4. A glass composition characterized by high level photoluminescent emissions under appropriate excitation and having a batch compositional analysis consisting essentially of the following ingredients and proportions:

| Ingredients: | Parts by weight |
|---|---|
| $SiO_2$ | 63.9 |
| $Al_2O_3$ | 1.6 |
| $Na_2O$ | 4.6 |
| $K_2O$ | 10.5 |
| $ZnO$ | 17.3 |
| $B_2O_3$ | 2.2 |

References Cited

UNITED STATES PATENTS

| | | | |
|---|---|---|---|
| 2,049,765 | 8/1936 | Fischer | 252—301.4 |
| 2,097,275 | 10/1937 | Fischer | 252—301.4 |
| 2,099,602 | 11/1937 | Fischer | 252—301.4 |
| 2,219,895 | 10/1940 | Hanlein | 252—301.4 |
| 2,270,124 | 1/1942 | Huniger et al. | 252—301.4 |
| 2,440,048 | 4/1948 | Hood | 252—301.4 |

OTHER REFERENCES

Claffy et al.: Copper Activated Aluminosilicate Phosphors, Journal of the Electrochemical Society, volume 98, No. 10, October 1951, pages 409–413.

Chemicals That Accelerate Melting The Glass Industry, September 1935, page 273.

TOBIAS E. LEVOW, *Primary Examiner.*

R. D. EDMONDS, *Assistant Examiner.*

U.S. Cl. X.R.

106—52, 54